United States Patent [19]

Wagner

[11] Patent Number: 4,787,091

[45] Date of Patent: Nov. 22, 1988

[54] CHEMICAL LASER SYSTEM EMPLOYING IODINE ATOMS AS A LASING GAS

[75] Inventor: Ross I. Wagner, Woodland Hills, Calif.

[73] Assignee: Rockwell International Corporation, El Segundo, Calif.

[21] Appl. No.: 72,830

[22] Filed: Jul. 13, 1987

[51] Int. Cl.[4] .............................................. H01S 3/095
[52] U.S. Cl. ...................................... 372/89; 372/55; 372/39; 372/58
[58] Field of Search .................... 372/55, 38, 89, 58, 372/59

[56] References Cited

U.S. PATENT DOCUMENTS

| | | | |
|---|---|---|---|
| 3,863,176 | 1/1975 | Martinez et al. | 372/89 |
| 4,102,950 | 7/1978 | Pilipovich et al. | 423/579 |
| 4,267,526 | 5/1981 | McDermott et al. | 372/89 |
| 4,310,502 | 1/1982 | Wagner | 423/579 |
| 4,461,756 | 7/1984 | Rockenfeller | 372/89 |
| 4,535,457 | 8/1985 | Schlie et al. | 372/59 |

*Primary Examiner*—Léon Scott, Jr.
*Attorney, Agent, or Firm*—H. Fredrick Hamann; Harry B. Field; David C. Faulkner

[57] ABSTRACT

A chemical iodine laser system 10 is provided with a reactive iodine producing container (12) for housing a reactive iodine generating composition. Singlet delta oxygen produced by oxygen generator (30) is mixed with iodine atoms and conveyed to a laser cavity.

12 Claims, 1 Drawing Sheet

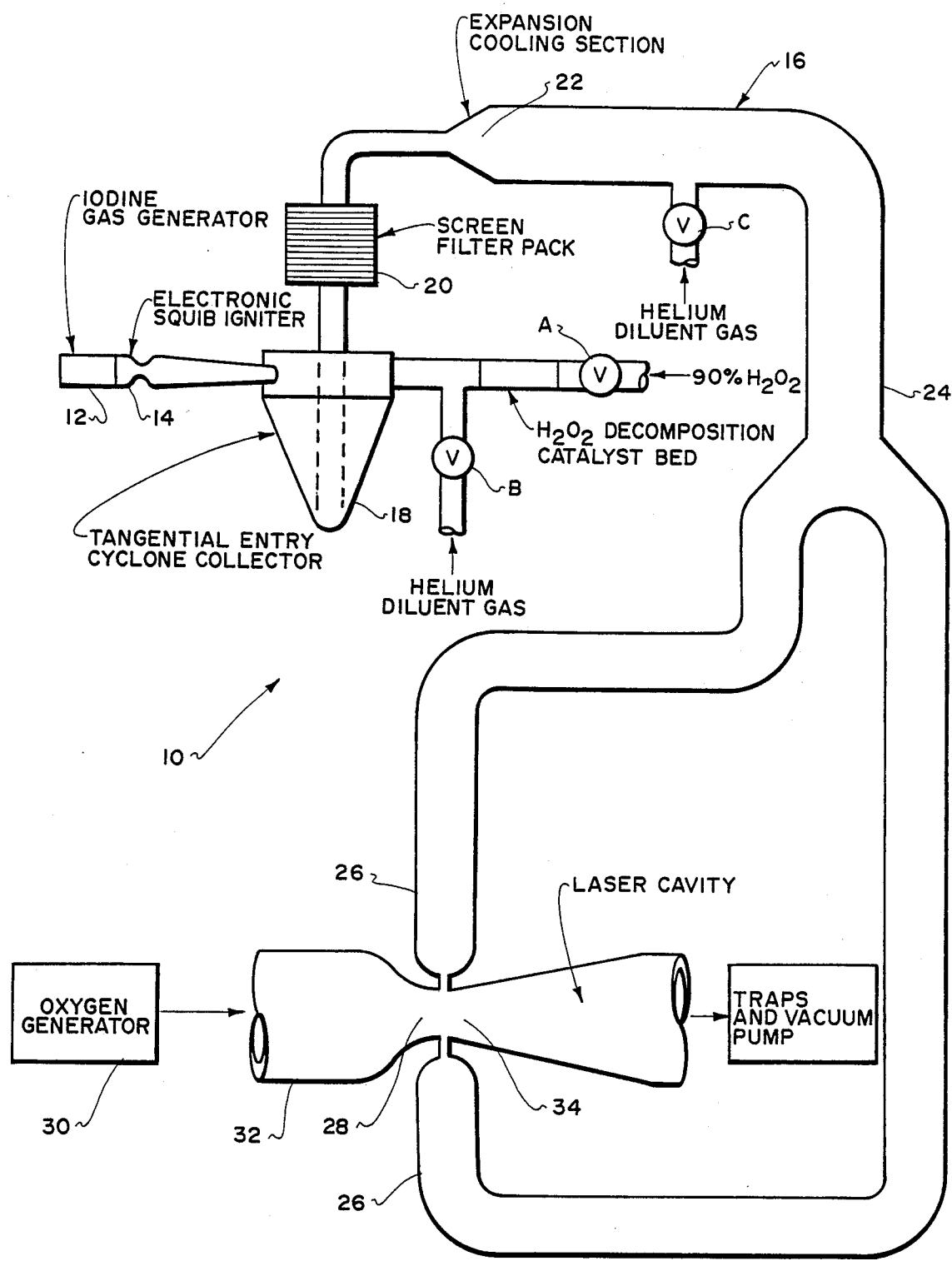

CHEMICAL LASER SYSTEM EMPLOYING IODINE ATOMS AS A LASING GAS

BACKGROUND OF THE INVENTION

1. Field of the Invention

The present invention relates to chemical iodine lasers, and more particularly to a chemical laser system including an apparatus for generating atomic iodine.

2. Background Art

The mechanics of gas lasers are currently well known. Chemical lasers induce a lasing action by mixing an optically active lasing medium with an electronically excited energizing gas and then directing a flow of the resultant gaseous mixture into an optical laser cavity where the lasing action is generated. The lasing medium and the electronically excited gas react chemically to provide the necessary population inversion and lifetime required to create the lasing action.

In oxygen/iodine laser systems, iodine is utilized as the optically active medium and singlet delta oxygen, $O_2(^1\Delta)$, as the energizing gas. The chemical generation of gaseous $O_2(^1\Delta)$ is well known in the art. For example, U.S. Pat. No. 4,102,950 and U.S. Pat. No. 4,310,502 describe $O_2(^1\Delta)$ generators and are incorporated herein by reference. The optically active lasing medium, iodine, must also be in the form of a gas or vapor in order to be mixed into the electronically excited energizing gas, $O_2(^1\Delta)$. Under ambient conditions iodine exists as a solid in its molecular form, $I_2$, which melts at 113.5° C. and boils at 184.4° C. Thermal energy must be supplied to the solid $I_2$ to convert it to a vapor suitable for use in an oxygen/iodine transfer laser system.

An iodine laser is based on the electronic transition between excited atomic iodine and ground state atomic iodine according to the following equation:

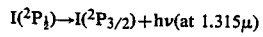

Among the advantages of the iodine laser is emittance at a single frequency (1.315μ); the shortest wavelength yet attained by purely chemical means. The most common chemical method for producing the excited atomic iodine, $I(^2P_{\frac{1}{2}})$ or I*, is well known in the art as disclosed in U.S. Pat. No. 4,267,526, incorporated by reference. The disclosed method consists of mixing molecular iodine vapor, $I_2$, with electronically excited oxygen, $O_2(^1\Delta)$. The mechanism by which $I_2$ is converted to I* is believed to involve a number of steps and may be represented by the following equations:

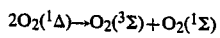

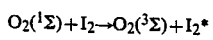

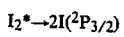

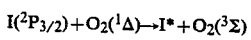

If all or a portion of the iodine mixed into the $O_2(^1\Delta)$ were in the ground state atomic form, $I(^2P_{3/2})$, an overall decrease in the amount of $O_2(^1\Delta)$ would be required to attain the same concentration of I* in the gas mixture. However, the extreme corrosivity of thermally hot iodine is due primarily to the reactivity of atomic iodine. Consequently it has been more practical to atomize molecular iodine at relatively low temperatures using the excitation energy stored in the excited $O_2(^1\Delta)$.

In the chemically driven oxygen/iodine transfer laser, the conventional source of iodine is the element itself transformed into a molecular vapor by applicaton of heat or by radiation as disclosed in U.S. Pat. No. 4,434,492. This physical process is extremely energy inefficient in that it requires the iodine supply to be kept hot continuously in order to be utilized on demand.

SUMMARY OF THE INVENTION

An object of the present invention is to provide a chemical transfer laser system which utilizes atomic iodine as the optically active medium and $O_2(^1\Delta)$ as the energizing gas.

Another object of the present invention is to provide a laser capable of emitting radiation at infrared wavelengths.

A further object of the present invention is to provide a chemical system which when activated will provide without additional external energy a constant supply of elemental iodine as a mixture of ground state molecular and atomic forms.

According to the present invention, $O_2(^1\Delta)$ is generated in an oxygen generator and conveyed to a mixing venturi where the singlet delta oxygen acts as the energizing gas for the iodine atoms. The iodine atoms admixed with iodine molecules are generated in an iodine generating apparatus by the self-sustaining reaction of iodine generating compositions. The mixture of excited singlet delta oxygen and iodine is then conveyed from the mixing venturi to a laser cavity for initiation of a lasing action.

The foregoing and other objects, features and advantages of the present invention will become more apparent in light of the following detailed description of preferred embodiments thereof as illustrated with the accompanying drawing.

BRIEF DESCRIPTION OF THE DRAWING

FIG. 1 is a schematic diagram of one embodiment of a chemical oxygen/iodine transfer laser system in accordance with the present invention utilizing a chemical iodine generator in cooperative association with an integrated or conduit assembly functionally joining the iodine generating apparatus. Also shown in the figure, a mixing venturi is associated with the iodine generating apparatus and conveyance system in which the gases used in the laser are excited in, or just prior to entering, an optical cavity.

DESCRIPTION OF THE PREFERRED EMBODIMENT

Referring now to FIG. 1, a chemical iodine laser system 10 is provided with a reactive iodine producing container 12 for housing a reactive iodine generating composition. The reactive iodine producing container is also provided with means for effecting a chemical reaction of the iodine atom generating composition. This particular embodiment utilizes an electronic squib ignitor 14.

To prevent condensation of the iodine produced by the chemical reaction the entire conveying system, whereby the iodine is transported to the laser cavity, must be heated. This rapid heating is effected by passing hydrogen peroxide ($H_2O_2$) through inlet valve A to a conventional decomposition catalyst bed which converts the liquid $H_2O_2$ into a mixture of oxygen and super heated stream according to the formula:

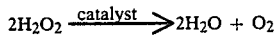

The resulting hot gases passing through the iodine conveying system heat it above the condensation temperature of the iodine just prior to initiating the iodine generating chemical reaction.

The iodine generating apparatus which includes the iodine producing container 12 and squib igniter 14 is functionally associated with conveying system 16 including tangential entry cyclone collector 18 (for solids or liquids) which itself acts as a mixing chamber for diluent helium which may be introduced at inlet valve B. The helium enters into the tangential cyclone collector 18 where it mixes with the reaction products produced within the iodine producing container 12 and the major portion of the solid or liquid reaction products are separated from the gaseous products.

From cyclone collector 18 this mixture travels into screen filter pack 20 where the residual solid or liquid reaction products are separated from the iodine/helium mixture. From filter pack 20 the resulting mixture is introduced into an expansion cooling section 22 so as to be intimately mixed with additional helium diluent gas introduced at inlet valve C. From the cooling section the $I_2$/He gas proceeds through a conduit 24 to a manifold 26 which conveys this mixture to mixing venturi 28. At the mixing venturi 28 the $I_2$/He gas is caused to mix with singlet delta oxygen generated within the oxygen generator 30 and delivered to venturi 28 by conduit 32. A supersonic flow of the singlet delta oxygen through the venturi causes the iodine/helium mixture to be conveyed into an expansion nozzle 34 connecting the venturi with a laser cavity. During the passage of the singlet delta oxygen and iodine into the expansion nozzle a near-resonant energy transfer from the excited $O_2(^1\Delta)$ to the lasing gas occurs resulting in the excitation of the atomic iodine to an energy level capable of emitting photons. When the excited iodine atoms release their excitation energy within the laser cavity, laser radiation in the infrared spectrum is generated.

The reactive iodine generating composition contained within the reactive iodine producing container comprises a combustible fuel and oxidizer. The fuel and oxidizer are selected such that on ignition a highly exothermic self-sustaining oxidation-reduction reaction will occur which generates iodine as the only volatile product.

Elemental iodine may be incorporated into the fuel/oxidizer composition within the reactive iodine producing container and the heat of reaction will volatilize the additional iodine. An advantage of adding elemental iodine is the cooling action afforded by the volatilization of the added iodine particularly for reactive iodine generating compositions which have sufficiently high adiabatic reaction temperatures to cause volatilization of products other than iodine. Volatilization of such products diminishes the utility of these formulations because of iodine injector orifice plugging at the mixing venturi where lower temperatures result in formation of solids or liquids.

The following nonlimiting examples are illustrative of the functioning of various chemical iodine systems.

EXAMPLE 1

A solid propellant grain consisting of 76.7% $BI_3$ and 23.3% $NaIO_3$ is ignited by means of a standard electrically initiated $B/KNO_3$ ignitor. Self-sustaining combustion proceeds with an adiabatic flame temperature of 1654° K. to produce a non-volatile liquid mixture of 2.6% $NaBO_2$ and 7.9% $Na_2B_4O_7$ plus 89.5% of a gaseous mixture of atomic and molecular iodine (atomic iodine fraction=0.737). The gaseous iodine is diluted with 9 volumes of helium and maintained at a temperature of not less than 400° K. until it enters the mixing venturi. For a given flowrate of $O_2(^1\Delta)$ the ratio of iodine/oxygen is maintained constant in the range 0.005 to 0.03 by appropriate sizing of the combustion surface area in the reactive iodine producing container.

EXAMPLE 2

A solid propellant grain consisting of 73.9% $SiI_4$, 4.6% CaO, and 21.5% $Ca(IO_3)_2$ when ignited in the same manner as in Example 1, produced 16.0% of a solid $CaSiO_3/CaO/SiO_2$ mixture and 84.0% of a gaseous mixture of atomic and molecular iodine (atomic I fraction=0.474) delivered at an adiabatic temperature of 1471° K. When elemental iodine was added to this formulation so that it consisted of 43.5% $SiI_4$, 2.7% CaO, 12.6% $Ca(IO_3)_2$, and 41.2% $I_2$, the products of the chemical reaction were 9.4% of the solid $CaSiO_3/CaO/SiO_2$ mixture and 90.6% of the gaseous $I/I_2$ mixture (atomic I fraction=0.088) delivered at an adiabatic temperature of 1145° K. The gaseous iodine was freed of solids, diluted with helium, and delivered to the mixing venturi as in Example 1.

In Table I are listed further examples (3–21) of preferred solid fuel/oxidizer compositions together with the adiabatic reaction temperatures, weight percent of iodine generated, weight fraction of atomic iodine, and the weight percent of non-volatile by-products.

TABLE I

| | Solid Propellant Iodine Generating Compositions | | | | | |
|---|---|---|---|---|---|---|
| Example No. | Fuel, Percent | Oxidizer, Percent | Adiabatic Temp., °K. | Iodine, Wt. % | Atomic I Fraction | Non-Volatile By-Products, % |
| 3 | 79.6 $BI_3$ | 20.4 $I_2O_5$ | 1867 | 92.6 | 0.903 | 7.1 $B_2O_3$ |
| 4 | 75.3 $BI_3$ | 22.5 $Ca(IO_3)_2$ | 1639 | 87.9 | 0.719 | 12.1 $Ca(BO_2)_2$ |
| 5 | 78.8 $BI_3$ | 7.8 $Na_2O_2$ | 2232 | 86.8 | 0.980 | 13.2 $NaBO_2$ |
| 6 | 94.8 $BI_3$ | 5.3 $NaN_3$ | 1564 | 81.9 | 0.618 | 6.0 BN |
| 7 | 71.5 $BI_3$ | 28.5 $CaCrO_4$ | 1359 | 69.5 | 0.304 | 11.5 $Ca(BO_2)_2$ |
| | | | | | | 19.0 $Ca(CrO_2)_2$ |
| 8 | 80.3 $AlI_3$ | 19.7 $I_2O_5$ | 1608 | 90.0 | 0.679 | 10.0 $Al_2O_3$ |
| 9 | 76.1 $AlI_3$ 2.1 CaO | 21.8 $Ca(IO_3)_2$ | 1452 | 85.2 | 0.444 | 14.8 $Ca(AlO_2)_2$ |
| 10 | 72.3 $AlI_3$ | 27.7 $CaCrO_4$ | 1124 | 67.5 | 0.076 | 14.0 $Ca(AlO_2)_2$ |
| | | | | | | 18.5 $Ca(CrO_2)_2$ |
| 11 | 80.0 $SiI_4$ | 20.0 $I_2O_5$ | 1667 | 91.0 | 0.752 | 9.0 $SiO_2$ |
| 12 | 94.9 $SiI_4$ | 5.1 $NaN_3$ | 905 | 79.9 | 0.010 | 8.3 $Si_3N_4$ |
| | | | | | | 11.8 NaI |

TABLE I-continued

Solid Propellant Iodine Generating Compositions

| Example No. | Fuel, Percent | Oxidizer, Percent | Adiabatic Temp., °K. | Iodine, Wt. % | Atomic I Fraction | Non-Volatile By-Products, % |
|---|---|---|---|---|---|---|
| 13 | 72.0 SiI$_4$ | 28.0 CaCrO$_4$ | 1186 | 68.2 | 0.116 | 15.6 CaSiO$_3$<br>9.3 Ca(CrO$_2$)$_2$<br>6.9 Cr$_2$O$_3$ |
| 14 | 93.9 SiI$_4$ | 6.3 Na$_2$C$_2$ | 857 | 66.7 | 0.001 | 7.0 SiC<br>26.3 NaI |
| 15 | 80.6 MgI$_2$ | 19.4 I$_2$O$_5$ | 1270 | 88.3 | 0.193 | 11.7 MgO |
| 16 | 70.5 LiI | 29.5 KIF$_6$ | 1198 | 80.2 | 0.126 | 13.7 LiF<br>6.1 KF |
| 17 | 72.8 NaI | 27.2 KIF$_6$ | 1007 | 74.0 | 0.029 | 20.4 NaF<br>5.6 KF |
| 18 | 74.8 KI | 25.2 KIF$_6$ | 517 | 68.6 | 0.000 | 31.4 KF |
| 19 | 20.3 AlI$_3$<br>62.9 KI$_3$ | 16.8 KIF$_6$ | 1056 | 83.6 | 0.045 | 12.9 K$_3$AlF$_6$<br>3.5 KF |
| 20 | 93.7 CI$_4$ | 6.3 Na$_2$C$_2$ | 1678 | 68.7 | 0.763 | 4.3 C<br>27.0 NaI |
| 21 | 92.3 C$_6$I$_6$ | 7.7 Na$_2$C$_2$ | 1899 | 58.1 | 0.915 | 10.5 C<br>31.4 NaI |

In Table II are listed additional examples (22–32) of preferred fuel/oxidizer compositions in which one of the components, either the fuel or the oxidizer, is in a fluid state (liquid or gaseous). In this embodiment the fuel and oxidizer must be separated in the reactive iodine producing container. Controlled additional of the fluid moiety to the solid moiety with appropriate initiation of reaction (by electronic squib if the fuel/oxidizer combination is not hypergolic) establishes the rate of generation of iodine.

TABLE II

Solid Propellant Iodine Generating Compositions

| Example No. | Fuel, Percent | Oxidizer, Percent | Adiabatic Temp., °K. | Iodine, Wt. % | Atomic I Fraction | Non-Volatile By-Products, % |
|---|---|---|---|---|---|---|
| 22 | 95.2 BI$_3$ | 4.8 N$_2$O$_4$ | 1800 | 92.6 | 0.866 | 4.8 B$_2$O$_3$<br>2.6 BN |
| 23 | 95.3 SiI$_4$ | 4.7 N$_2$O$_4$ | 1469 | 90.3 | 0.471 | 6.1 SiO$_2$<br>3.6 Si$_3$N$_4$ |
| 24 | 75.1 LiI | 24.9 IF$_5$ | 1343 | 85.5 | 0.283 | 14.5 LiF |
| 25 | 63.1 LiI<br>16.0 I$_2$ | 20.9 IF$_5$ | 1261 | 88.8 | 0.182 | 12.2 LiF |
| 26 | 77.2 NaI | 22.8 IF$_5$ | 1162 | 78.4 | 0.099 | 21.6 NaF |
| 27 | 78.9 KI | 21.1 IF$_5$ | 696 | 72.4 | 0.000 | 27.6 KF |
| 28 | 27.1 AlI$_3$<br>64.1 I$_2$ | 8.8 IF$_5$ | 1135 | 94.4 | 0.082 | 5.6 AlF$_3$ |
| 29 | 26.6 AlI$_3$<br>26.2 LiI | 17.4 IF$_5$ | 1362 | 89.5 | 0.308 | 10.5 Li$_3$AlF$_6$ |
| 30 | 25.0 AlI$_3$<br>30.6 KI | 16.3 IF$_5$ | 1271 | 84.2 | 0.194 | 15.8 K$_3$AlF$_6$ |
| 31 | 75.8 MgI$_2$ | 24.2 IF$_5$ | 1584 | 83.0 | 0.647 | 17.0 MgF$_2$ |
| 32 | 76.8 CaI$_2$ | 23.2 IF$_5$ | 1518 | 79.6 | 0.548 | 20.4 CaF$_2$ |

In addition to the specific compositions set forth in Examples 1 and 2 and in Tables I and II, further useful reactive iodine generating compositions may be formulated from mixtures of fuels with a given oxidizer, mixtures of oxidizers with a given fuel, and mixtures of both fuels and oxidizers. For example, the following formulations will be useful reactive iodine generating compositions: MgI$_2$/SiI$_4$+I$_2$O$_5$; AlI$_3$/LiI+KIF$_6$; BI$_3$+Ca(IO$_3$)$_2$/CaCrO$_4$; BI$_3$/AlI$_3$+NaIO$_3$/Ca(IO$_3$)$_2$; MgI$_2$/KI+IF$_5$.

Although the invention has been shown and described with respect to preferred embodiments thereof, it should be understood by those skilled in the art that various changes may be made therein without departing from the spirit and scope of the invention.

Having thus described a preferred embodiment of my invention, that which I claim is new and desired to secure by Letters Patent of the United States is:

1. A chemical oxygen/iodine transfer laser system including an apparatus for chemical generation of gaseous iodine comprising:
   (a) means for conveying gaseous iodine from an iodine generating apparatus to a mixing venturi said generating apparatus comprising: (1) a reactive iodine producing container; (2) a reactive iodine generating composition including a combustible fuel and an oxidizer retained within the container; and (3) an electronic squib igniter means for effecting a chemical reaction, of the reactive iodine generating composition within the container
   (b) means for producing and conveying an excited energizing gas to a mixing venturi to be mixed and reacted with gaseous iodine;
   (c) a laser cavity; and
   (d) means for conveying mixed and reacted iodine atoms and excited energized gas to the laser cavity.

2. A chemical oxygen/iodine transfer laser system according to claim 1 in which the means for conveying gaseous iodine from the iodine generating apparatus to a mixing venturi comprises an integrated conduit assembly functionally joining the iodine generating apparatus and the mixing venturi.

3. A chemical oxygen/iodine transfer laser system according to claim 1 in which the means for producing and conveying an excited energizing gas to the mixing venturi comprises:

(a) an excited energizing gas generator; and venturi.

4. A chemical oxygen/iodine transfer laser system according to claim 1 in which the means for conveying the iodine atoms and excited energized gas to the laser cavity comprises an expansion nozzle connecting the venturi and the laser cavity.

5. A chemical oxygen/iodine transfer laser system according to claim 1 in which the reactive iodine generating composition comprises a combustible fuel and an oxidizer; the fuel being solid $BI_3$ and an oxidizer selected from the group consisting of $I_2O_5$, $NaIO_3$, $Ca(IO_3)_2$, $Na_2O_2$, $CaCrO_4$, and $N_2O_4$.

6. A chemical oxygen/iodine transfer laser system according to claim 1 in which the reactive iodine atom generating composition is a solid fuel $AlI_3$ and an oxidizer selected from the group consisting of $I_2O_5$, $Ca(IO_3)_2$, $CaCrO_4$, $KIF_6$, and $IF_5$.

7. A chemical oxygen/iodine transfer laser system according to claim 1 in which the reactive iodine atom generating composition is a fuel selected from the group consisting of $CI_4$ and $C_6I_6$ and $Na_2C_2$ as the oxidizer.

8. A chemical oxygen/iodine transfer laser system according to claim 1 in which the reactive iodine atom generating composition fuel is $SiI_4$ and the oxidizer is selected from the group consisting of $I_2O_5$, $Ca(IO)_3)_2$, $Na_2C_2$, $CaCrO_4$, and $N_2O_4$.

9. A chemical oxygen/iodine transfer laser system according to claim 1 in which the reactive iodine atom generating composition includes a fuel selected from the group consisting of $AlI_3$, $LiI$, $NaI$, $KI$, and $KI_3$ and $KIF_6$ as the oxidizer.

10. A chemical oxygen/iodine transfer laser system according to claim 1 in which the reactive iodine atom generating composition comprises a fuel selected from the group consisting of $MgI_2$, $CaI_2$, $AlI_3$, $LiI$, $NaI$ and $KI$ and $IF_5$ is the oxidizer.

11. The chemical oxygen/iodine transfer laser system of claim 1 wherein the reactive iodine generating composition includes a combustible fuel selected from the group consisting of: $BI_3$, $AlI_3$, $CI_4$, $C_6I_6$, $SiI_4$, $LiI$, $NaI$, $KI$, $KI_3$, $MgI_2$, and $CaI_2$.

12. The chemical oxygen/iodine transfer laser system of claim 1 wherein the reactive iodine generating composition includes an oxidizer selected from the group consisting of: $I_2O_5$, $NaIO_3$, $Ca(IO_3)_2$, $Na_2O_2$, $CaCrO_4$, $N_2O_4$, $KIF_6$, $IF_5$, and $N_2C_2$.

* * * * *